United States Patent [19]

Su et al.

[11] Patent Number: 4,740,533

[45] Date of Patent: Apr. 26, 1988

[54] WETTABLE, FLEXIBLE, OXYGEN PERMEABLE, SUBSTANTIALLY NON-SWELLABLE CONTACT LENS CONTAINING BLOCK COPOLYMER POLYSILOXANE-POLYOXYALKYLENE BACKBONE UNITS, AND USE THEREOF

[75] Inventors: Kai C. Su; J. Richard Robertson, both of Alpharetta, Ga.

[73] Assignee: Ciba-Geigy Corporation, Ardsley, N.Y.

[21] Appl. No.: 78,346

[22] Filed: Jul. 28, 1987

[51] Int. Cl.$^4$ .......................................... C08F 283/04
[52] U.S. Cl. .................................. 523/106; 525/453; 525/474; 525/479; 528/25; 528/28; 528/29; 528/32; 528/33
[58] Field of Search ....................... 528/25, 28, 29, 32, 528/33; 523/106; 525/474, 479, 453

[56] References Cited

U.S. PATENT DOCUMENTS

| | | | |
|---|---|---|---|
| 3,228,741 | 1/1966 | Becker | 351/160 |
| 3,341,490 | 9/1967 | Burdick et al. | 260/37 |
| 3,673,272 | 6/1972 | Dean | 260/827 |
| 3,808,178 | 4/1974 | Gaylord | 260/86.1 E |
| 3,996,187 | 12/1976 | Travnicek | 260/37 SB |
| 3,996,189 | 12/1976 | Travnicek | 260/37 SB |
| 4,136,250 | 1/1979 | Mueller et al. | 528/29 |
| 4,150,048 | 4/1979 | Schilling, Jr. et al. | 260/448.2 |
| 4,153,641 | 5/1979 | Deichert et al. | 260/827 |
| 4,294,974 | 10/1981 | Le Boeuf | 556/440 |
| 4,395,527 | 7/1983 | Berger | 528/26 |
| 4,440,918 | 4/1984 | Rice et al. | 526/246 |
| 4,486,577 | 12/1984 | Mueller et al. | 525/474 |

OTHER PUBLICATIONS

Fatt, Soft Contact Lens: Clinical and Applied Technology, Ruben, Ed., John Wiley and Sons (1978), pp. 83–110.
Polym./Plast. Technol. Eng. 8(2), (1977), pp. 155–175 "Barrier Polymers".
BASF Technical Data on Pluronic Polyols, pp. 1–11.
BASF Technical Data on Pluronic R Polyols, pp. 1–13.

*Primary Examiner*—Morton Foelak
*Attorney, Agent, or Firm*—Irving M. Fishman; Michael W. Glynn

[57] ABSTRACT

Contact lenses which are optically clear, wettable, flexible, of high oxygen permeability and substantially non-swellable in the aqueous ocular environment of use, of a block copolymer containing polysiloxane and polyoxyalkylene oxide units are disclosed, as well as the preparation thereof and methods of treating vision defects therewith.

54 Claims, No Drawings

WETTABLE, FLEXIBLE, OXYGEN PERMEABLE, SUBSTANTIALLY NON-SWELLABLE CONTACT LENS CONTAINING BLOCK COPOLYMER POLYSILOXANE-POLYOXYALKYLENE BACKBONE UNITS, AND USE THEREOF

This application is a continuation-in-part of application Ser. No. 928,240 filed Nov. 6, 1986, now abanonded.

BACKGROUND OF THE INVENTION

1. Field of the Invention

This invention relates to ophthalmic devices, such as contact lenses and intraocular implants, and particularly contact lenses of a block copolymer containing polysiloxane and polyoxyalkylene oxide units possessing an advantageous blend of desirable properties including (a) high oxygen permeability, (b) good wettability, (c) flexibility, (d) optical clarity, and e) a substantial lack of aqueous swellability in the ocular environment of use.

2. Background Art

The use of siloxane containing materials of various types in the fabrication of ophthalmic devices is well known.

Thus, in U.S. Pat. Nos. 3,996,187; 3,996,189; 3,341,490 and 3,228,741 there are described contact lenses fabricated from poly (organosiloxanes) containing fillers. While such lenses are generally soft and of high oxygen permeability, the use of fillers such as silica, is indicated in order to increase the otherwise generally poor tear strength and tensile strength. Also, such silicone rubber lenses are characteristically both hydrophobic and lipophilic.

U.S. Pat. No. 3,808,178 discloses hard contact lenses fabricated from copolymers of a polysiloxanylakyl acrylate or methacrylate ester and an alkyl acrylate or metacylate ester. The monomers and polymers of the patent are hydrophobic and are incompatible with hydrophilic materials such as hydroxyethyl methacrylate. While the disclosed lenses have increased oxygen permeability, they are rigid.

U.S. Pat. No. 4,136,250 discloses hydrogels of a copolymer of about 20 to about 90% of a hydrophilic (or mixture of hydrophilic and hydrophobic) monomer and about 10 to about 80% of a polyolefinic siloxane macromer which can be used to fabricate a contact lens. Typically, such hydrogels are recited to possess a degree of swelling of about 10 to about 12%. It has been found, however, that the presence of substantial amounts of water in such hydrogels limits the oxygen permeability of such materials.

U.S. Pat. No. 4,153,641 relates, in relevant part, to contact lenses fabricated from a polymer of a polyorganosiloxane terminated with vinylic groups, or copolymers thereof with other monomers. The exemplified products therein are hydrophobic in nature.

U.S. Pat. No. 4,486,577 relates to copolymers of about 8 to 70% of a polysiloxane macromer containing at least two vinyl groups and 30-92% of a monomer which is at least predominantly water insoluble to make polymers useful, for example, as contact lenses.

Generally, such prior art contact lens compositions are either insufficiently hydrophilic in terms of surface wettability to be acceptable to the contact lens profession, even though they may possess high oxygen permeability, or such contact lenses are of acceptable wettability but the hydrophilicity is coupled with water swellability, which tends to limit optimum oxygen permeability.

It is an object of the present invention to overcome these and other disadvantages of the art by providing ophthalmic devices, such as contact lenses and corneal implants, possessing a high degree of surface wettability but which are substantially non-swellable in the aqueous environment of use, and possessing a high degree of oxygen permeability by employing a crosslinked block polymer containing polysiloxane and polyalkylene oxide units.

A further object of the invention is to provide a method of correcting visual defects in the form of refractive errors by fitting to the patient's eye in need of the same, a corrective contact lens of such polymer. These and other objects of the invention are apparent from the following detailed description of the invention.

DETAILED DESCRIPTION

One embodiment of the present invention relates to an optically clear, hydrolytically stable, biologically inert, wettable and flexible, oxygen permeable ophthalmic device, such as a contact lens, which is substantially non-swellable in aqueous ocular tear fluid, which is fabricated from a crosslinked polymer of a reactive, monomer having a segment $S''$ of the formula $$-(D-S'-L-D-A-L)-_b \qquad (I'),$$

preferably, said monomer having the formula $$-(DALS'')-_c \qquad (Ia)$$ or $$-(S'')_c-DS'L_a'- \qquad (Ib),$$

even more preferably, said monomer having the formula

  (I)

(and more preferably said monomer being divinylic) wherein each $S'$ is independently

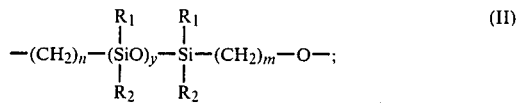  (II)

each A is independently

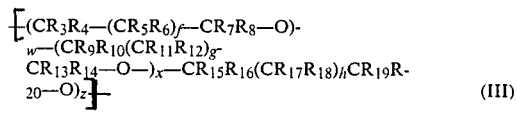  (III)

the terminal oxygen within each unit of formula II and III being replaceable by $-NR_{21}-$ a is 0 or 1;
each L is independently $-BRB'-$ and the terminal L group within c may also be $-BR-$ when a=1;
$L_a'$ being selected from $-BRB'-$ and $-BR-$; each D is $-O-$ or $-NR_{21}-$
$L'$ is H, $P'-R-B'-$, or $P'-BRB'-$;
$L''$ is H, $-P'$, or if a=0 also $-D-S'-BRB'$ or $-D-S'-BRB'-P'$ b is 1-10; c=1-10; b times c=1-10; (w+x+z)times q=4-1000 each q being 1-1000; and each w, x and z being 0-100 provided at least one of w, x and z is at least 1;

each n and m is an integer from 1 to 6;

y=2-75, preferably 2-50, more preferably 10-50, most preferably 15-50;

f, g, h are each independently 0-4, preferably 0 or 1;

$R_1$ and $R_2$ are independently alkyl up to $C_{18}$, aryl up to $C_{12}$, preferably lower alkyl or phenyl, most preferably methyl;

each of $R_3$, $R_4$, $R_7$–$R_{10}$, $R_{13}$–$R_{16}$, $R_{19}$ and $R_{20}$ are independently selected from the group H, halogen (preferably fluorine or chlorine, more preferably fluorine), aliphatic, aromatic or heterocyclic containing radical such as: unsubstituted $C_1$–$C_{16}$ alkyl; substituted $C_1$–$C_{16}$ alkyl; unsubstituted $C_2$–$C_{16}$ alkenyl; and substituted $C_2$–$C_{16}$ alkenyl; wherein the alkyl and alkenyl substituents are independently selected from $C_1$–$C_{16}$ alkoxycarbonyl, $C_2$–$C_{16}$ alkenyloxycarbonyl, fluoro, aryl of up to 10 carbon atoms, $C_1$–$C_{16}$, preferably $C_1$–$C_8$, alkoxy, $C_1$–$C_{16}$ alkanoyloxy, aryloxy of up to 10 carbon atoms, $C_3$–$C_6$ alkenoyloxy, aroyl of up to 10 carbon atoms, aroyloxy of up to 11 carbon atoms, $C_3$–$C_8$ cycloalkyl, $C_3$–$C_8$ cycloalkyloxy, $C_3$–$C_8$ cycloalkyl-carbonyl, $C_3$–$C_8$ cycloalkoxy-carbonyl, oxacycloalkyl of up to 7 carbon atoms, oxacycloalkoxy of up to 7 carbon atoms, oxacycloalkoxy (up to 7 carbon atoms)-carbonyl, oxacycloalkyl (up to 7 carbon atoms)-carbonyloxy, and aryl (of up to 10 carbon atoms)-oxycarbonyl, each of said alkyl and alkenyl groups within the foregoing substituents being, in turn, optionally substituted by $C_1$–$C_6$ alkyl, fluoro, or a $C_1$–$C_6$ alkoxy provided said last mentioned alkoxy is not bound to a carbon atom already singly bound to another oxygen atom; $R_3$, $R_4$, $R_7$–$R_{10}$, $R_{13}$–$R_{16}$, $R_{19}$ and $R_{20}$ being further independently selected from aryl of up to 10 carbon atoms, $C_3$–$C_8$ cycloalkyl, and cycloalkyl, and oxacycloalkyl of up to 7 carbon atoms, each of which may be unsubstituted or further substituted with a substituent selected from the group of substituents for said $R_3$ alkyl set forth above; $R_5$, $R_6$, $R_{11}$, $R_{12}$, $R_{17}$ and $R_{18}$ are selected from the same group set forth above for $R_3$; and $R_5$, $R_6$, $R_{11}$, $R_{12}$, $R_{17}$ and $R_{18}$ are further independently selected from $C_1$–$C_{16}$ alkoxycarbonyl, $C_2$–$C_{16}$ alkanoyloxy, $C_2$–$C_{16}$ alkenoxycarbonyl, and $C_3$–$C_{16}$ alkenoyloxy, each of which may be further substituted by fluoro, aryl of up to 10 carbon atoms, or $C_1$–$C_{16}$ alkoxy, and $R_5$, $R_6$, $R_{11}$, $R_{12}$, $R_{17}$ and $R_{18}$ are still further independently selected from aryloxy of up to 10 carbon atoms, cycloalkoxy of up to 8 carbon atoms, cycloalkyl (of up to 8 carbon atoms)-carbonyloxy, cycloalkoxy (of up to 8 carbon atoms)-carbonyl, aroyloxy of up to 11 carbon atoms, oxacycloalkoxy of up to 7 carbon atoms, oxacycloalkenyloxy of up to 7 carbon atoms, oxacycloalkoxy (of up to 7 carbon atoms)-carbonyl, oxacycloalkyl (of up to 7 carbon atoms)carbonyloxy, and aryloxy (of up to 10 carbon atoms)-carbonyl, each of which may be further substituted by fluoro, $C_1$–$C_6$ alkyl or $C_1$–$C_6$ alkoxy, provided that any substituent having an oxygen atom as its link to the rest of the molecule may not be a substituent on the same carbon atom which is singly bonded to another oxygen atom. In addition, 2 adjacent R groups, together with the atoms to which they are attached may form a 5-8 membered cycloalkyl, oxacycloalkyl or bicycloalkyl ring.

In the foregoing, all alkyl groups whether mentioned alone or as part of another group are preferably $C_1$–$C_4$ alkyl, such as methyl, ethyl, propyl and butyl, especially t-butyl, with the exception that adjacent groups on aryl rings cannot each be t-butyl. These alkyl groups may be straight chain or branched chain. When the alkyl is a substituent on a phenyl ring, it is preferably attached at the para position. Preferable alkenyl groups, whether alone or as part of another group, are preferably $C_2$–$C_4$ alkenyl, such as ethenyl, propenyl and butenyl. Preferred aryl groups (whether alone or as part of another group) are phenyl and naphthyl, more preferably phenyl. Preferably the aryl groups are still further substituted by $C_1$–$C_4$ alkyl, more preferably t-butyl, most preferably in the para position.

Preferably f, g and h are independently 0-3, more preferably 0-2, most preferably 0 or 1. While the group identified by formula I may be highly halogenated, it is preferably at least 25% halogen free, more preferably 30%, still more preferably 40%, and most preferably substantially halogen free. Wherever cyclo groups are indicated, whether carbocyclic or heterocyclic they preferably have 5-6 ring members and the heterocyclics preferably have only carbon and an oxygen atom as ring members.

In formula I, when f is greater than one, each of the multiple $R_5$ and $R_6$ groups may be the same or different; however preferably all of the $R_5$ groups are the same and all of the $R_6$ groups are the same. The same is true with respect to g, $R_{11}$, and $R_{12}$; and h, $R_{17}$, and $R_{18}$.

In one aspect of the invention, each of $R_3$–$R_7$, $R_9$–$R_{13}$, and $R_{15}$–$R_{19}$ are hydrogen. Preferred substituents for $R_8$, $R_{14}$ and $R_{20}$ are alkyl of up to 16 carbon atoms; alkyl of up to 16 carbon atoms substituted by alkoxy of up to 8 carbon atoms, or fluoro; phenyl which is unsubstituted or substituted by fluoro, alkoxy of up to 6 carbon atoms or alkyl of up to 6 carbon atoms; benzyl wherein the phenyl ring thereof is unsubstituted or substituted by fluoro, alkoxy of up to 6 carbon atoms or alkyl of up to 6 carbon atoms; cyclohexyl; or oxacycloalkyl of 4 to 5 ring carbon atoms.

A highly advantageous subembodiment relates to wettable, non-swellable ophthalmic devices, preferably contact lenses, fabricated from a polymer according to formula I wherein A is of the formula IV:

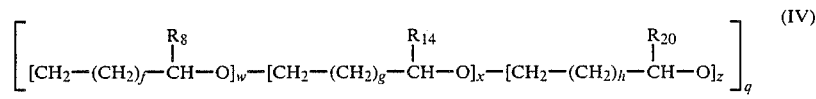

(IV)

wherein f, g, h, q, w, x, z, $R_8$, $R_{14}$ and $R_{20}$ are as defined above. There are two very highly advantageous embodiments having formula IV which are represented by either formulae V

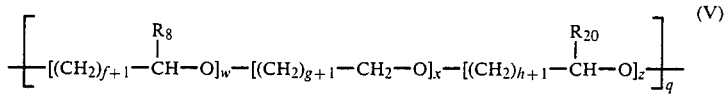

wherein f, g and h are each independently preferably 0–2, more preferably 0–1, most preferably 0; w, x, z and q are as defined above; and $R_8$ and $R_{20}$ are hydrogen or one is, but preferably both are, an aliphatic, aromatic, or heterocyclic radical, preferably alkyl of up to 6 carbon atoms; alkyl of up to 6 carbon atoms substituted by alkoxy of up to 6 carbon atoms or fluoro; phenyl which is unsubstituted or substituted by fluoro, alkoxy of up to 6 carbon atoms or alkyl of up to 6 carbon atoms; benzyl wherein the phenyl ring thereof is unsubstituted or substituted by fluoro, alkoxy of up to 6 carbon atoms or alkyl of up to 6 carbon atoms; cyclohexyl or oxacycloalkyl of 4 to 5 ring carbon atoms; or by formula VI

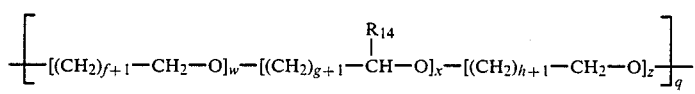

wherein f, g, h, w, x, z and q are as defined above for formula V and $R_{14}$ is selected preferably selected from the same group as $R_8$ in formula IV.

In the foregoing it is to be understood that the units of w, x and z may be positioned randomly, in block segments, or alternately.

Another preferred embodiment corresponds to formulae IV, V and VI when z is zero.

Desirably, the polymer segments of formula III or IV in the completed polymer are predominantly and preferably substantially devoid of free hydroxyl groups in the interior of the polymer as such groups tend to reduce oxygen permeability.

Free hydroxy groups on the outer surfaces of the formed polymer are acceptable as they increase wettability without drawing water into the polymer matrix. However, it is still preferable to have as few free hydroxy groups in the finished polymer as practical if a contact lens having high oxygen permeability is to be prepared. A suitable means of tying up the free hydroxy groups present would be to interact them with a color group. Typical color groups useful in these embodiments include, but are not limited to, the hydroxy reactive dyes known in the art under the tradename Remazol, manufactured by American Hoechst. Examples of the Remazol dyes which are especially useful are:

Remazol Brill Blue RW (Color Index Code: Reactive Blue 19);

Remazol Yellow GR (Color Index Code: Reactive Yellow 15);

Remazol Black B (Color Index Code: Reactive Black 5);

Remazol Golden Orange 3GA (Color Index Code: Reactive Orange 78); and

Remazol Turquoise P (Color Index Code: Reactive Blue 21);

all of which have at least one group of the formula

—SO$_{02}$—CH$_2$CH$_2$O—SO$_3$(—)

which reacts with the polymer or monomer hydroxy group to yield

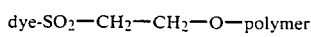

or

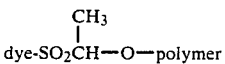

group, preferably the former. In such a manner, both excess free hydroxy groups are disposed of and colored contact lenses can be realized simultaneously. The color group or former can be reacted with monomer before the monomer is incorporated into the structure of formula I or afterwards. Another means of disposing of these excessive hydroxy groups is to utilize their presence to form various degrees and types of crosslinking.

$R_{21}$ is H, $C_1$–$C_4$ alkyl, phenyl, preferably H; each of B and B' are selected from

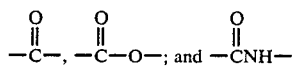

with the carbonyl group being bound to A, S', D or P'; each R is a divalent linking group preferably selected from (i) a divalent aliphatic group of up to 25, carbon atoms which may be interrupted by oxy, carbonyloxy, amino, aminocarbonyl, oxycarbonyl, ureido, oxycarbonylamino, or carbonylamino;

(ii) a divalent 5–7 membered cycloaliphatic having 5–25 carbon atoms;

(iii) a divalent arylene group have 6–25, preferably 7–15 carbon atoms; and (iv) a divalent aralkyl or alkaryl having 7 to 25 preferably 8–16 carbon atoms; wherein groups ii and iv can be optionally interrupted by the same groups as in group i and wherein the aryl rings in groups iii and iv may be further substituted with one or more substituents selected from halogen, preferably fluorine or chlorine, $C_1$–$C_4$ alkyl, preferably methyl, and $C_1$–$C_{12}$ perhalo alkyl, especially $C_1$–$C_{12}$ perfluoro alkyl;

and P' is H, $NH_2$, OH, or a moiety containing a crosslinkable group which may be crosslinked when co-reacted with a suitable crosslinking agent or when irradiated by actinic radiation.

The vinylic comonomer is frequently utilized to increase the hydrophilicity of the final product without substantially altering the other properties mentioned above. Typically, when the vinylic comonomer is a polyethylene glycol of the formula

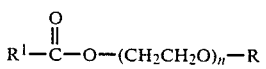

or pyrrolidone of the formula

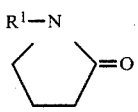

with n being 1-25, R being H or $CH_3$ and $R^1$ being $CH_2=CH-$, $CH_2=C(CH_3)-$ or other UV curable moiety, the resultant polymer is more hydrophillic than previously, but the Dk is essentially the same as when the comonomer is absent.

Usually, when present, the vinylic comonomer is used in an amount of about 2% to about 10% by weight of the resultant polymer. Advantageously, no more than 5% of vinylic comonomer is used when the compound of formula V has a molecular weight in excess of 8000. Generally, when the compound of formula V has a molecular weight of under about 4000, up to 10% by weight of vinylic comonomer can be used. When the compound of formula V has a molecular weight between 4,000 and 8,000, the maximum amount of vinylic comonomer is between 5% and 10% by weight.

When P' is

with $R_a$ and $R_b$ as defined below or contains such a group

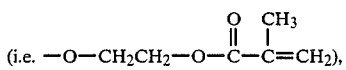

then the monomer of formula I can be crosslinked in t absence of up to less than about 50%, preferably up to about 30%, most preferably up to about 10% by weight of other vinylic comonomers, provided that such comonomers are substantially free of hydroxy groups in the final product.

When P' does not have a vinylic qroup, but takes part in crosslinking, P' contains an active hydrogen, and preferably terminates in a OH, $NHR_c$ ($R_c$ being H or lower alkyl), a leaving group bound directly to the B or B' carbonyl, a conventional acyl leaving group when not so bound, SCN— or OCN—. Crosslinking is then typically carried out by condensation with a B' or polyfunctional coreactive monomer. For example, when P' is OH, then the coreactive monomer functional group can be $-NHR_c$, $-COOH$, OCN, SCN, etc.; when P' is $NHR_c$, the reactive comonomer functional group can be a conventional acyl leaving group; and when P' has OCN— or SCN—, then the reactive comonomer functional group can be OH. Similarly, the other coreactive functional groups mentioned in terms of either P' or the coreactive monomer can be interchanged. Those mentioned as part of P' being on the coreactive monomer and those mentioned as part of the coreactive monomer being part of P'.

Suitable vinylic monomers and coreactive monomers for condensation are set forth below. However, the list is not exhaustive and those of ordinary skill will appreciate the modifications, additions, and alternatives which may also be employed.

When either or both L' and L" are H, or terminate in P' with P' being H, at least one additional crosslinkable moiety must be present as one of, or a substituent on one of, the groups $R_1-R_{21}$. Such crosslinkable groups may also be present as a substituent on or in place of one or more of $R_1-R_{21}$ even when both L' and L" have crosslinkable groups therein. However, the degree of crosslinking in the finished crosslinked polymer should not exceed 10%, preferably not greater than 5%, more preferably 1-4%, most preferably 2-3%.

Within the polymer fabricated from monomers of formula I, not more than 20-70%, preferably not more than 50% of the A groups are polyethylene glycol.

The number of A units and the chain length and nature of the substituents on the polyoxyethylene segment is determined by the degree of wettability desired in the polymer of the compound of formula I. In general, the polymer should be sufficiently hydrophilic in its surface properties such that the polymer exhibits a contact angle with distilled water at 20° C. of less than 60°, preferably less than 40°, more preferably less than 25°, still more preferably less than 15°, most preferably less than 10°.

The greater the number of siloxane units, the greater the number of oxyalkylene units is generally required to reduce the contact angle to within the above limits.

Further, a large excess of unsubstituted oxyethylene units is to be avoided, as such excess units tend to cause the polymer to be swellable. As water is taken up, the oxygen permeability of such polymers tends to be drastically reduced. Advantageously, the instant polymers absorb less than about 10% by weight water, preferably less than about 5% by weight, most preferably less than 30% by weight water.

Highly preferred are those polymers which exhibit a contact angle of less than 25°, more preferably less than 15° and most preferably less than 10°.

Preferred crosslinked polymers are those consisting essentially of a polymer of a divinylic monomer according to formula I wherein $R_1$ and $R_2$ are methyl, n and m are 2 to 4, y is 2-20; f-h=zero, $R_3$, $R_4$ are hydrogen; $R_8$, $R_{14}$ and $R_{20}$ are independently alkyl of up to 8 carbon atoms, w+x+z times q is 4-40 and P' is:

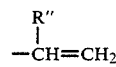

with R" being H or methyl.

Very highly advantageous are those polymers of reactive vinylic monomers of the formula VII:

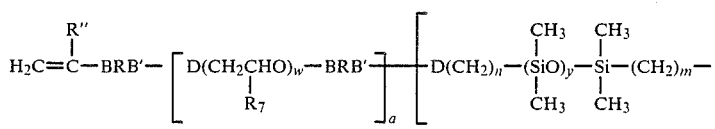

VII

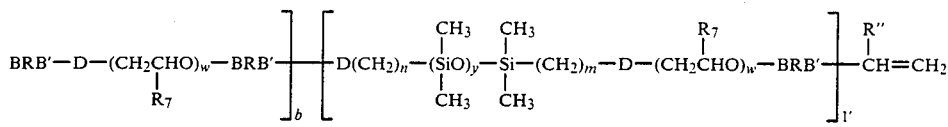

where one of a and 1' is one and the other zero; R" is hydrogen or methyl; each R is a divalent arylene group of 6 to 15 carbon atoms, a divalent $C_6$-$C_{10}$-arylene-amino carbonyloxy-$C_2$-$C_6$ alkylene; or divalent $C_3$-$C_{15}$ cycloaliphatic;

B and B' are each

each $R_7$ is alkyl of 1 to 6 carbon atoms, or mixtures thereof with units wherein $R_7$ is hydrogen, preferably with the proviso that $R_7$ can be hydrogen in no more than about 15% more preferably 50 percent, still more preferably no more than 30 percent, of the units; each w is 4–75 preferably 6–70, more preferably 8–66; y is 2–66, preferably 2–25, more preferably 2–20; m and n are independently 2, 3 or 4; and b is an integer of 1–10, preferably 1–8, more preferably 1–6, still more preferably 1–4, most preferably 1–2.

Within this very highly advantageous embodiment, R" is most preferably methyl; R is most preferably —phenylene—, —CH$_2$CH$_2$OCONH—phenylene— or CH$_2$CH$_2$OCONH—tolylene—; $R_7$ is methyl, w is most preferably 60 to 66; y is most preferably 15 to 20; b is most preferably 1 to 3; 1' is most preferably 0; and a is most preferably 1.

A very highly preferred embodiment are those polymers from monomers of formula VII wherein each

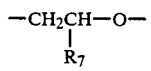

group is of the formula

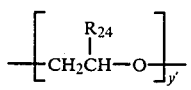

where $R_{24}$ is alkyl of 1 to 4 carbon atoms, most preferably methyl, and y' is from about 6 to about 200, preferably from about 25 to about 100, and most preferably from about 50 to about 75.

Also highly preferred are those polymers of monomers of formula VII wherein each

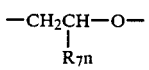

is of the formula (VIII)

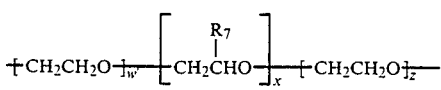

wherein w' is between about 2 to about 20 and x is about 8 to about 100, and z about 4 to about 80. Another valuable embodiment requires the value of x to be at least about twice that of w' or z and $R_7$ to be alkyl of 1 to 4 carbon atoms, preferably methyl.

The reactive vinylic monomers of formula I can characteristically be polymerized to form crosslinked polymers under conventional polymerization conditions.

If desired, the monomer reaction mixture may contain a catalytic amount of a conventional polymerization catalyst, preferably a free radical catalyst.

Of particular interest are conventional peroxide and azo catalysts, such as hydrogen peroxide, benzoyl peroxide, tert-butyl peroctoate, benzoyl peroxide or azobis (isobutrylnitrile).

The polymerization can generally be carried out at temperatures between about 20° to about 150° C., for a period between about 1 to about 24 hours. It is understood that the time and temperature in such a reaction are inversely related. Thus, temperatures employed in the upper end of the temperature range will generally provide reaction times near the lower end of the time range. Preferrably, the polymerization is conducted in the presence of actinic radiation, such as UV light.

Depending upon the nature of the polymer mixture, it may be desirable for the polymers obtained from such polymerizations to be post cured, eg. at a somewhat elevated temperature such as between about 60° C. to about 150° C.

For the preparation of contact lenses, the polymer mixture may be cast directly in the shape of the lens, or the polymerization may be carried out in a mold having a shape convenient for further processing, such as in the shape of small cylinders or "buttons", which can then be machined.

Minor amounts i.e. less than 50%, preferably up to 30%, and most preferably up to no more than about 10% by weight, of conventional copolymerizible vinyl monomers, can be employed as extenders or hydrophilic modifiers, or the like, in the preparation of the instant polymer, as copolymer constituents. Suitable vinyl monomers include:

acylates and methacrylates of the general formula

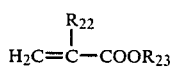

where $R_{22}$ is hydrogen or methyl and $R_{23}$ is a straight chain or branched aliphatic, cycloaliphatic or aromatic group having up to 20 carbon atoms which is unsubstituted or substituted by one or more alkoxy, alkanoyloxy or alkyl of up to 12 carbon atoms, or by halo, especially chloro or preferably fluoro, or $C_3$-$C_5$ polyalkyleneoxy of 2 to about 100 units;

acrylamides and methacrylamides of the general formula

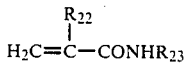

where $R_{22}$ and $R_{23}$ are defined above;
vinyl ethers of the formula $$H_2C=CH-O-R_{23}$$

where $R_{23}$ is as defined above;
vinyl esters of the formula $$H_2C=CH-OOC-R_{23}$$

where $R_{23}$ is as defined above;
maleates and fumarates of the formula $$R_{23}OOC-HC=CH-COOR_{23}$$

where $R_{23}$ is as defined above;
and vinylic substituted hydrocarbons of the formula $$R_{22}CH=CHR_{23}$$

where $R_{22}$ and $R_{23}$ are as defined above.

Useful monomers include, for example:
methyl-, ethyl-, propyl-, isopropyl-, butyl-, ethoxyethyl-, methoxyethyl-, ethoxypropyl-, phenyl-, benzyl-, cyclohexyl-, hexafluoroisopropyl-, or n-octyl-acrylates and -methacrylates as well as the corresponding acrylamides and methacrylamides;

dimethylfumarate, dimethylmaleate, diethylfumarate, methyl vinyl ether, ethoxyethyl vinyl ether, vinyl acetate, vinyl propionate, vinyl benzoate, acrylonitrile, styrene, alphamethyl styrene, 1-hexene, vinyl chloride, vinyl methyl ketone, vinyl stearate, 2-hexene and 2-ethylhexyl methacrylate.

As hydrophilic modifiers, to increase hydrophilicity without substantial loss of DK, the vinyl comonomer can be a N-(vinyl containing group)-pyrrolidone or a polyoxyethylene (of 1-25 repeating units) acrylate or methacrylate. Such a hydrophilic modifier should not be present in excess of about 10% by weight of the compound of formula I.

Most preferably, the instant polymers are free from copolymer units of such conventional vinyl monomers.

The vinylic monomers of formula I can be prepared by methods known, per se.

For example, the siloxane/polyalkylene oxide containing divinylic monomers of formula I may be prepared by reacting a siloxane diol of the formula HO—(G)—H, wherein —G— is a group of the formula

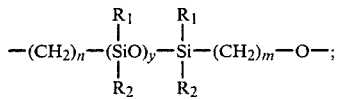

with a sufficient amount of a difunctional reactive group containing compound having the group —Q— or —Q—Y—, wherein the difunctional reactive groups are isocyanate; activated carboxy, such as an anhydride, an acid halide or a carboxy ester; or is a leaving group, such as a halide, sulfato or the like, to form the corresponding reactive group containing endcapped derivative.

The resulting endcapped siloxane derivative can then be reacted with a polyoxyalkylene diol of the formula HO—(A)—H, wherein —A— is a group of formula III above. To form the corresponding polyoxyalkylene —siloxane— polyoxyalkylene diol. This diol can be then reacted with a reactive group containing vinylic monomer having the terminal $H_2C=C(R'')-BR-$ moiety, wherein the reactive group is an isocyanate; activated carboxy, such as an anhydride, an acid halide or carboxy ester, or is a leaving group such as halo, sulfato or the like to form the corresponding divinyl derivative where b is 1, and A is other than a direct bond. Alternatively, the aforementioned polyoxyalkylene—siloxane—polyoxyalkylene diols can be further sequentially reacted with a further difunctional reactive group containing compound having the group —BR— or —BRB'—D— to form the corresponding di functional reactive endcapped derivative which is then reacted with a siloxane diol of the formula HO—(G)—H. One may continue building up alternative polyoxyalkylene/siloxane unit containing diols in this manner, corresponding to the value of either "c(a plus b)" or c(b plus 1')". Then this diol may be endcapped with a reactive group containing vinylic monomer having a terminal $H_2C=C(R'')-BR-$ moiety or the diol reacted with a sufficient amount of difunctional reactive group containing compound to endcap the diol with a reactive group, such as eg. an isocyanate, etc. group which is then reacted with the appropriate vinylic containing compound, such as an vinylic amine or alcohol, or other copolymerizable monomer having a crosslinkable group to obtain the corresponding product of formula I.

Of course, instead of starting with a siloxane diol of the formula HO—(G)—H and building up the alternating sequence to the desired value of "b", one may instead begin with a polyoxyalkylene diol of the formula HO—(A)—H and, after endcapping the same with difunctional reactive groups, condense the same with the siloxane diol until the desired value of "a" is attained, and terminate the diol with vinylic groups as described above.

The above reactive vinylic monomers are characteristically polymerized under conventional polymerization conditions. In those vinylic monomers containing but one vinyl group, a minor amount eg. from about 0.01 to about 5 weight percent, based on the monomer of formula I, of a conventional crosslinking agent, may be employed. Suitable crosslinking agents include diolifinic monomers such as:

Allyl acrylate and methacrylate; alkylene glycol and polyalkylene glycol diacrylates and dimethacrylates, such as ethyleneglycol dimethacrylate, diethylene glycol dimethacrylate, and propylene glycol dimethacrylate; trimethylol propane triacrylate; pentaerythritol tetracrylate, divinylbenzene; divinyl ether; divinyl sulfone;

bisphenol A diacrylate or dimethacrylate; methylene bisacrylamide; diallyl phthalate; triallyl melamine and hexamethylene diacrylate and dimethacrylate. Also, such minor amounts of a crosslinking agent may be employed, if desired, in the polymerization of the divinyl monomer of formula I and VII.

When the monomers of formula I have free hydroxy, isocyanato, carboxylic acid, or amine groups, suitable crosslinking agents contain di or poly functional coreactive groups to form addition or condensation reactions linking 2 or more chains.

If desired, the monomer reaction mixture may contain a catalytic amount of a conventional catalyst, preferably a free radical catalyst. Of particular interest are conventional peroxide and azo catalysts, such as hydrogen peroxide, benzoyl peroxide, tert-butyl peroctoate, benzoyl peroxide or azobis (isobutrylnitrile).

The aforementioned reactions are generally straight forward additions or condensations and are typically conducted at a reaction temperature between about -10° C. to about 100° C., depending upon the relative reactivity of the species involved, in the presence or absence of an inert diluent and in the optional presence of an addition or condensation catalyst if desired or appropriate. For reactions involving an isocyanate or acid halide, with a diol, for example, suitable optional catalysts include pyridine and triethylamine.

The siloxane diols of the formula HO-(G)-H are known in the art and many are commercially readily available.

Also, the polyoxyalkylene diols of the formula HO-A-H are known or can be prepared by known methods.

Thus, the polyols of the formula HO-A-H are generally prepared by the addition reaction of wq moles of an epoxide of the formula

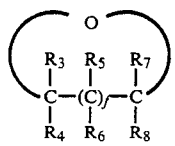 (IX)

where $R_3$–$R_8$, f, w, and q are as defined above, with xq moles of an epoxide of the formula

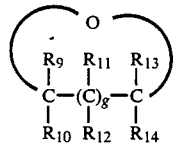 (X)

where $R_9$–$R_{14}$, g, x, and q are as defined above, and zq moles of an epoxide of the formula

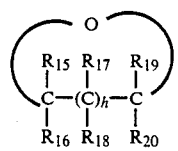 (XI)

wherein $R_{15}$–$R_{20}$, z, and q are as defined above, optionally in the presence of a conventional alkylation catalyst, at atmospheric to elevated pressures of up to about 30 atmospheres gauge, at temperatures between 0° C. to about 130° C., optionally in the presence of an inert diluent. If desired, one may add to the reaction mixture, prior to the reaction of the epoxides, an aliphatic, aromatic or cycloaliphatic alcohol, acid or amine having up to 14 carbon atoms to prepare the corresponding mono-ols terminating in the group D.

The reaction between the epoxides, when mixtures of different epoxides are employed to obtain the polyol of the formula HO-A-H, can be conducted by admixing the epoxides to obtain random copolymers or terpolymers, etc., or the addition can be conducted sequentially to form block copolymers having terminal hydroxy groups. Suitable catalysts include alkaline earth oxides, alkaline earth carbonates, alkyl zinc compounds, aluminum alkoxides, hydrates of ferric chloride, bromide and acetate, and gamma radiation. The reaction may also by initiated by the presence of a glycol, such as ethylene glycol or propylene glycol or by a polyol of higher functionality such as sucrose, or by an amine, such as ethylene diamine, toluenediamine, and so forth. Generally the length of time of the reaction will depend in part on the alkylene oxide employed, but can generally be from less than one to several score hours. Thus, ethylene oxide generally is about three times as active as propylene oxide, which in turn reacts more rapidly than 1,2-butylene oxide. The preparation of polyoxitanes and polyetetrahydrofurans are generally initiated via ring opening oxonium formation using trialkyloxonium salts, carboxonium salts, acylium salts and the like.

Suitable diols of the formula HO—A—H include those prepared from epoxides such as:

1,2-propylene oxide; 1,2-butylene oxide; 1,2-epoxydecane; 1,2-epoxydodecane; 1,2-epoxyoctane; 2,3-epoxynorbornane; 1,2-epoxy-3-ethoxypropane; 1,2-epoxy-3-phenoxypropane; 2,3-epoxypropyl 4-methoxyphenyl ether; tetrahydrofuran; 1,2-epoxy-3-cyclohexyloxypropane; oxetane; 1,2-epoxy-5-hexene; 1,2-epoxyethylbenzene; 1,2-epoxy-1 methoxy-2-methylpropane; perfluorohexylethoxypropylene oxide; benzyloxypropylene oxide; and the like. Also, the aforementioned epoxides may be employed as mixtures thereof. Further, certain cyclic ethers of formula IX, X and XI where f, g or h, respectively is 3 and the carbocyclic portion of the ring is substituted are resistant to polymerization alone, copolymerize quite readily with more reactive cyclic ethers. Suitable co-monomers include, for example, 2-methyl-tetrahydrofuran and 3-methyl-tetrahydrofuran. Also, while ethylene oxide may be employed as a co-monomer, ethylene oxide polymers, in the absence of more hydrophobic units, is characteristically too hydrophilic and absorbs too much aqueous fluid to be of use in accordance with the instant invention. However, ethylene oxide/propylene oxide copolymeric diols wherein there is 30-80%, preferably greater than 50% more preferably greater than 66%, propylene oxide, on a mole basis is sufficiently hydrophobic so as to be substantially non-swellable in aqueous media, and yet sufficiently hydrophilic so as to exhibit a contact angle with water of less than 60°, preferably less than 40°, more preferably less than 25°, still more preferably less than 15°, most preferably less than 10°.

Many polymer diols of the formula HO—A—H are commercially available. Thus, suitable diol products include poloxamers having the general formula

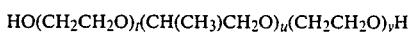

wherein u has a value between about 16 and 100 and the sum of a and c is between about 4 to about 100. Examples of such poloxamers, and their average values of t, u and v, include poloxamer 101 (t is 2, u is 16, v is 2); poloxamer 122 (t is 5, u is 21, v is 5); poloxamer 181 (t is 3, u is 30, v is 3); poloxamer 212 (t is 8, u is 35, v is 8); poloxamer 231 (t is 6, u is 39, v is 6); poloxamer 282 (t is 10, u is 47, v is 10); poloxamer 331 (t is 7, u is 54, v is 7); poloxamer 401 (t is 6, u is 67, v is 6).

Such poloxamers are available, e.g. from BASF Wyandotte under their Pluronic ® brand name. Also suitable are the "reverse poloxamers", having polyethylene glycol bounded on each side by polypropylene glycol.

Polypropylene ether glycols include commercially available products having a molecular weight range between about 400 to about 4,000.

As stated above, the polymers for use in the instant invention are those which exhibit a receding contact angle at 20° C. of less than 60°, preferably less than 40°, more preferably less than 25°, more preferably less than 15° and most preferably less than 10°. The measurement of such contact angle is conveniently performed using a modified "Wilhelmy Plate" technique, as described, for example, for J. D. Androde, et al. *Surface and Interfacial Aspects of Biomedical Polymers*, Vol. 1, Surface Chemistry and Physics, Plenum Press, 1985, wherein a specimen sample in the form of a plate of known dimensions is immersed into the wetting solution, pure water, at a slow controlled rate, e.g. at 2–20 mm per minute.

As mentioned above, the instant polymers for use in the present invention possess a high degree of oxygen permeability. The oxygen permeability, $DK(\times 10^{-10}$ mm. $ccO_2/cm.^2sec.mmHg)$, is measured using a modification of ASTM standard D3985-81 in that (a) there is used 21% oxygen, i.e. air, instead of 99–100% oxygen, (b) the surface area of sample employed is 0.50 square meters versus 100 square meters and the humidity is controlled to be at 95–100% relative humidity instead of 0% relative humidity.

Typically, conventional fully swollen polyhydroxyethyl methacrylate lenses which are sparingly crosslinked possess a $Dk(\times 10^{-10}$ mm. $ccO_2/cm.^2sec.mmHg)$ value of about 5–7.

The oxygen permeability of the instant polymers for use as an ophthalmic device, such as a contact lens, advantageously possess a $Dk(\times 10^{-10}$ mm. $ccO_2/cm.^2sec.mmHg)$ value generally greater than 7, preferably greater than about 15, more preferably greater than about 20 and most preferably greater than about 40.

The following examples are for illustrative purposes and are not to be construed as limiting the invention. All parts are by weight unless otherwise specified.

EXAMPLE 1

To a dry, 0.25-liter, three-neck flask equipped with a thermometer, constant pressure dropping funnel, nitrogen inlet and condenser under a dry, nitrogen atmosphere is added 1.74 grams (0.010 moles) toluene diisocyanate, 10 milliliters dry methylene chloride and 0.05 grams tin octoate. 10.00 Grams (0.005 moles) poly(propylene oxide) in 40 ml of dry methylene chloride are added to the flask dropwise over a 40 minute period, maintaining a temperature less than 30° C. The reaction is continued for 2 hours. After two hours, 14.65 grams (0.010 moles) hydroxybutyl terminated polydimethylsiloxane in 30 milliliters of dry methylene chloride are added rapidly to the system and the reaction allowed to continue 17 hours. Then 1.74 grams (0.010 moles) toluene diisocyanate were added; and after 3 hours, 1.30 grams (0.010 moles) 2-hydroxyethylmethacrylate were added and the reaction stirred 18 hours. After 18 hours, the isocyanate band is not apparent in the infrared spectrum. The volatiles are then removed from the reaction system via vacuum rotary evaporation. The clear, viscous, reactive fluid is stored protected from light and thermal polymerization.

To the clear, viscous fluid is added one percent Darocur 1173 (UV initiator) and the mixture degassed and mixed via vacuum rotary evaporation. The material is then UV cured in the appropriate molds under UV light with an intensity of two to three milliwatts. The resulting film has an advancing contact angle of 65.5 and a receding angle of 16.2.

EXAMPLES 2–3

Similar reactions were conducted as described in Example 1 but with reactive components of different molecular weights and other variations as outlined in Table 1. The solvents were adjusted proportionally based on the weight of the materials used.

TABLE 1*

| Example | PPG | Silicone | TDI | HEMA | Tin Octoate | Darocur | DK |
|---|---|---|---|---|---|---|---|
| 2/18-92-1 | 30.23 (.01) | 40.03 (.02) | 6.96 (.04) | 2.60 (.02) | .06 | 1% | 159.0 |
| 3/18-53-1 | 6.40 (.0016) | 10.77 (.0032) | 1.12 (.0064) | 0.42 (.0032) | .08 | 1% | 257 |

*Weight is in grams.
Number in parentheses is molar quantity.
Initiator expressed in terms of percent of prepolymer in grams.
DK expressed in terms of DK units.

EXAMPLE 4

To a dry, 100-milliliter, three-neck flask equipped with a thermometer, constant pressure dropping funnel, nitrogen inlet and condenser under a dry, nitrogen atmosphere is added 3.48 grams (0.020 moles) toluene diisocyanate, 150 ml dry methylene chloride and dibutyl tin dilaurate and heat to reflux. 4-Hydroxybutyl polydimethylsiloxane 14.65 grams (0.010 moles) in 30 milliliters of dry methylene chloride are added dropwise to the flask. After 3 hours, 10.00 grams (0.005 moles) poly-(ethylene oxide) are added to the flask dropwise. The reaction is stirred at reflux for four hours and 1.30 grams (0.010 moles) of 2-hydroxyethylmethacrylate are charged to the flask. After 17 hours the isocyanate band is no longer observed in the infrared spectrum. The volaties removed via vacuum rotary evaporation. The clear, viscous, reactive fluid is protected from light and thermal polymerization until it is ready for use.

One percent Darocur 1173 is added to the prepolymer and the mixture degassed and mixed via vacuum rotary evaporation. The prepolymer was transferred to the appropriate molds and cured under UV light of three to five milliwatt intensity. The clear films produced in this manner had oxygen permeabilities of $148.8 \times 10^{-10}$

EXAMPLES 5–11

Similar reactions were conducted as described in Example 4 but with reactive components of different molecular weights and other variations as outlined in Table 1. The solvents were adjusted proportionally based on the weight of the materials used.

TABLE 2*

| Example | PPG | Silicone | TDI | HEMA | Tin Octoate | Darocur | DK |
|---|---|---|---|---|---|---|---|
| 5/258-72 | 50.72 (.013) | 37.15 (.025) | 8.83 (.050) | 3.30 (.025) | .02 | 1% | 125.4 |
| 6/258-81-86 | 30.77 (.018) | 52.20 (.036) | 12.40 (.071) | 4.64 (.036) | .03 | .5% | 133.1 |
| 7/258-82-89 | 33.26 (.017) | 50.31 (.034) | 11.96 (.069) | 4.47 (.034) | .03 | 1% | 179.1 |
| 8/258-91 | 32.67 (.011) | 31.91 (.022) | 7.58 (.044) | 2.83 (.022) | .08 | 1% | 130.0 |
| 9/258-93 | 21.21 (.011) | 43.65 (.021) | 7.38 (.042) | 2.76 (.021) | .04 | 1% | 258.5 |
| 10/23-12-1 | 19.07 (.01) | 75.00 (.02) | 6.96 (.04) | 2.60 (.02) | .11 | 1% | 340.3 |
| 11/23-30-1 | 19.08 (.01) | 55.27 (.02) | 6.96 (.04) | 2.61 (.02) | .07 | 1% | 388 |

*Weight is in grams.
Number in parentheses is molar quantity.
Initiator expressed in terms of percent of prepolymer in grams.
DK expressed in terms of DK units.

EXAMPLE 12

To a dry, 100, milliter, three-neck flask equipped with a thermometer, constant pressure dropping funnel, nitrogen inlet and condenser under a dry, nitrogen atmosphere atmosphere is added 3.48 grams (0.020 moles) toluene diisocyante, 150 ml dry methylene chloride and dibutyl tin dilaurate and heat to reflux. 4-Hydroxybutyl polydimethylsiloxane 14.65 grams (0.010 moles) in 30 milliliters of dry methylene chloride are added dropwise to the flask. After 3 hours, 10.00 grams (0.005 moles) poly(ethylene oxide) are added to the flask dropwise. The reaction is stirred at reflux for four hours and 1.30 grams (0.010 moles) of 2-hydroxyethylmethacrylate are charged to the flask. After 17 hours the isocyanate band is no longer observed in the infrared spectrum. The volaties removed via vacuum rotary evaporation. The clear, viscous, reactive fluid is protected from light and thermal polymerization until it is ready for use.

20 Percent by weight of PPGMM (Alcolac) and one percent Darocur 1173 is added to the prepolymer and the mixture degassed and mixed via vacuum rotary evaporation. The prepolymer was transferred to the appropriate molds and cured under UV light of three to five milliwatt per square centimeter intensity. The clear films produced in this matter had oxygen permeabilities of $208.2 \times 10^{-10}$.

We claim:

1. An optically clear wettable, flexible, oxygen permeable, substantially non-swellable ophthalmic device fabricated from a polymer of a crosslinkable monomer having a segment S" of the formula

wherein b is 1–10;

each D is independently —O— or —$NR_{21}$—;

each L is independently —BRB'—, the terminal L group within any one monomer also being capable of being —BR—;

each S' is independently of the formula

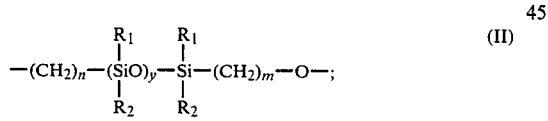

each A is independently of the formula

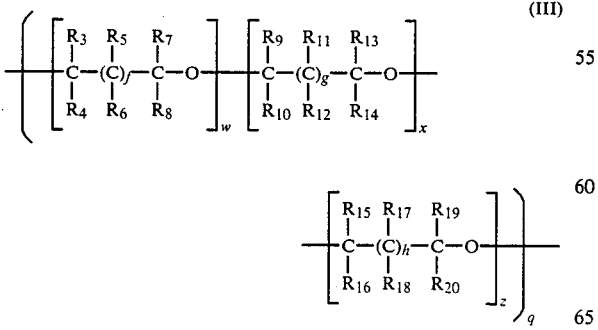

the terminal oxygen atom in formulae II or III being replaceable with —$NR_{21}$—;

each $R_1$ and $R_2$ is independently lower alkyl or aryl;

each $R_3$, $R_4$, $R_7$–$R_{10}$, $R_{13}$–$R_{16}$, $R_{19}$ and $R_{20}$ is independently selected from H, halogen, aliphatic, aromatic or heterocyclic containing radical selected from unsubstituted ($C_1$–$C_{16}$) alkyl; substituted $C_1$–$C_{16}$ alkyl; unsubstituted $C_2$–$C_{16}$ alkenyl; and substituted $C_2$–$C_{16}$ alkenyl; wherein the alkyl and alkenyl substituents are independently selected from $C_1$–$C_{16}$ alkoxycarbonyl, $C_2$–$C_{16}$ alkenyloxycarbonyl, fluoro, aryl of up to 10 carbon atoms, $C_1$–$C_{16}$ alkoxy, $C_2$–$C_{16}$ alkanoyloxy, aryloxy of up to 10 carbon atoms, $C_2$–$C_6$ alkenoyloxy, aroyl of up to 10 carbon atoms, aroyloxy of up to 11 carbon atoms, $C_3$–$C_8$ cycloalkyl, $C_3$–$C_8$ cycloalkyloxy, $C_3$–$C_8$ cycloalkyl-carbonyloxy, $C_3$–$C_8$ cycloalkoxy-carbonyl, oxacycloalkyl of up to 7 carbon atoms, oxacycloalkoxy of up to 7 carbon atoms, oxacycloalkoxy (up to 7 carbon atoms)-carbonyl, oxacycloalkyl (up to 7 carbon atoms)-carbonyloxy, and aryl (of up to 10 carbon atoms)-oxycarbonyl, each of said alkyl and alkenyl substituents being, in turn, optionally substituted by $C_1$–$C_6$ alkyl, fluoro or a $C_1$–$C_6$ alkoxy provided said last mentioned alkoxy is not bound to a carbon atom already singly bound to another oxygen atom; $R_3$, $R_4$, $R_7$–$R_{10}$, $R_{13}$–$R_{16}$, $R_{19}$ and $R_{20}$ being further independently selected from aryl of up to 10 carbon atoms, $C_3$–$C_8$ cycloalkyl, and oxacycloalkyl of up to 7 carbon atoms, each of which may be unsubstituted or further substituted with a substituent selected from the group of substituents for said $R_3$ alkyl set forth above; $R_5$, $R_6$, $R_{11}$, $R_{12}$, $R_{17}$ and $R_{18}$ are selected from the same group set forth above for $R_3$; and $R_5$, $R_6$, $R_{11}$, $R_{12}$, $R_{17}$ and $R_{18}$ are further independently selected from $C_1$–$C_{16}$ alkoxycarbonyl, $C_2$–$C_{16}$ alkanoyloxy, $C_2$–$C_{16}$ alkenoxycarbonyl, and $C_3$–$C_{16}$ alkenoyloxy, each of which is unsubstituted or further substituted by fluoro, aryl of up to 10 carbon atoms, or $C_1$–$C_{16}$ alkoxy; and $R_5$, $R_6$, $R_{11}$, $R_{12}$, $R_{17}$ and $R_{18}$ are still further independently selected from aryloxy of up to 10 carbon atoms, cycloalkoxy of up to 8 carbon atoms, cycloalkyl (of up to 8 carbon atoms)-carbonyloxy, cycloalkoxy (of up to 8 carbon atoms)-carbonyl, aroyloxy of up to 11 carbon atoms, oxacycloalkoxy of up to 7 carbon atoms, oxacycloalkenyloxy of up to 7 carbon atoms, oxacycloalkoxy (of up to 7 carbon atoms)-carbonyl, oxacycloalkyl (of up to 7 carbon atoms)-carbonyloxy, and aryloxy (of up to 10 carbon atoms)-carbonyl, each of which may be further substituted by fluoro, $C_1$–$C_6$ alkyl or $C_1$–$C_6$ alkoxy, provided that any substituent having a singly bound oxygen atom thereof as its link to the rest of the molecule may not be a substituent on the same carbon atom which is singly bonded to another oxygen atom; and 2 adjacent groups selected from $R_3$–$R_{20}$, together with the atoms to which they are attached may form a 5–8 membered cycloalkyl, oxacycloalkyl or bicycloalkyl ring;

each f, g and h are independently 0–3;

each w, x and z is independently 0–200;

q is 1–100;

(w+x+z) times q in any single group A is 4–1000;

each n and m is independently 1–6;

each y is independently 2–75;

each $R_{21}$ is independently H, $C_1$–$C_4$ alkyl, or phenyl;

each B and B' is independently

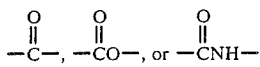

with the carbony in each case being bound to A, S', or D;

each R is independently
(i) a divalent aliphatic group of up to 25 carbon atoms which may be interrupted by oxy, carbonyloxy, amino, aminocarbonyl, oxycarbonyl, ureido, oxycarbonylamino, or carbonylamino;
(ii) a divalent 5-7 membered cycloaliphatic having 5-25 carbon atoms;
(iii) a divalent arylene group have 6-25, preferably 7-15 carbon atoms; and
(iv) a divalent aralkyl or alkaryl having 7 to 25; wherein groups b and d can be optionally interrupted by the same groups as in group i and wherein the aryl rings in groups iii and iv may be further substituted with one or more substituents selected from halogen, $C_1-C_4$ alkyl, and $C_1-C_{12}$ perhalo alkyl;

said device having a receding contact angle of less than 60%; being less than about 10% water in its swollen state; and having a Dk ($\times 10^{-10}$ mm $ccO_2/cm.^2sec.mmHg$) of at least about 7.

2. The device of claim 1 wherein b = 1.
3. The device of claim 1 wherein each D is oxygen.
4. The device of claim 1 wherein each L is —BRB'—, each B is —C(O)NH— wherein the nitrogen atom is bound to R, and R is

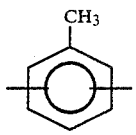

5. The device of claim 4 wherein R is

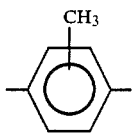

6. The device of claim 1 wherein each $R_1$ and $R_2$ is $CH_3$.
7. The device of claim 1 wherein n and m are each 4.
8. The device of claim 1 wherein y is from about 15 to about 50.
9. The device of claim 6 wherein n is 4; m is 4; and y is from about 15 to about 50.
10. The device of claim 1 wherein (w+x+z) times q is from about 25 to about 75.
11. The device of claim 1 wherein (a) each f, g, and h is 1 and $R_3$-$R_{20}$ are all hydrogen or (b) each f, g, and h is zero, each $R_3$, $R_4$, $R_8$-$R_{10}$, $R_{14}$-$R_{16}$, and $R_{20}$ is hydrogen, and each $R_7$, $R_{13}$, and $R_{19}$ is methyl.
12. The device of claim 11 wherein (w+x+z) times q is about 25 to about 75.
13. The device of claim 1 wherein
b is 1;
each D is oxygen;
each L is —BRB'—;
each B and B' are —C(O)NH— with the nitrogen atom bound to R;
each R is

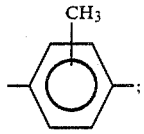

each $R_1$ and $R_2$ is methyl;
n and m are each 4;
y is from about 15 to about 50;
(w+x+z) times q is about 25 to about 75; and
(a) each f, g, & h is 1 and $R_3$-$R_{20}$ are all hydrogen; or
(b) each f, g, & h is zero; each $R_3$, $R_4$, $R_8$-$R_{10}$, $R_{14}$-$R_{16}$ and $R_{20}$ is hydrogen; and each $R_7$, $R_{13}$, and $R_{19}$ is methyl.

14. A wettable, flexible, oxygen permeable, substantially non-swellable ophthalmic device of claim 1
(a) fabricated from a polymer of a crosslinkable monomer having a partial formula $$-[(DAL)S'']-_c \qquad (I_a)$$

wherein each S'' is independently a segment of formula I' of claim 1;
each D, A and L is independently as defined in claim 1;
c is 1-8;
and b times c is 1-8;
or (b) fabricated from a crosslinkable monomer having a partial formula $$-[S'']_c—DS'L_a'— \qquad (I_b)$$

$L'_a$ selected from —DS'BRB'— and —DS'BR—;
B, R and B' are as defined in claim 1, and wherein S'', c, D and L are as defined above and S' B, R, B' are as defined in claim 1.

15. The device of claim 14 wherein b=1.
16. The device of claim 14 wherein each D is oxygen.
17. The device of claim 14 wherein each L is —BRB'—, each B is —C(O)NH— wherein the nitrogen atom is bound to R, and R is

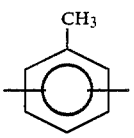

18. The device of claim 14 wherein R is

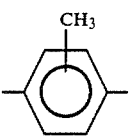

19. The device of claim 14 wherein each $R_1$ and $R_2$ is $CH_3$.
20. The device of claim 14 wherein n and m are each 4.
21. The device of claim 14 wherein y is from about 15 to about 50.

22. The device of claim 14 wherein n is 4; m is 4; and y is from about 15 to about 50.

23. The device of claim 14 wherein (w+x+z) times q is from about 25 to about 75.

24. The device of claim 14 wherein (a) each f, g, and h is 1 and $R_3$-$R_{20}$ are all hydrogen or (b) each f, g, and h is zero, each $R_3$, $R_4$, $R_8$-$R_{10}$, $R_{14}$-$R_{16}$, and $R_{20}$ is hydrogen, and each $R_7$, $R_{13}$, and $R_{19}$ is methyl.

25. The device of claim 14 wherein (w+x+z) times q is about 25 to about 75.

26. The device of claim 14 wherein c is 1.

27. The device of claim 26 wherein c is 1.

28. The device of claim 14 wherein L' is —D—S'—BRB'—.

29. The device of claim 14 wherein
b is 1;
each D is oxygen;
each L is —BRB'—; +
each B and B' are —C(O)NH— with the nitrogen atom bound to R; each R is

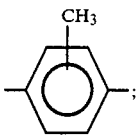

each $R_1$ and $R_2$ is methyl;
n and m are each 4;
y is from about 15 to about 50;
(w+x+z) times q is about 25 to about 75; and
(a) each f, g, and h is 1 and $R_3$-$R_{20}$ are all hydrogen; or
(b) each f, g, and h is zero; each $R_3$, $R_4$, $R_8$-$R_{10}$, $R_{14}$-$R_{16}$ and $R_{20}$ is hydrogen; and each $R_7$, $R_{13}$, and $R_{19}$ is methyl;
c is 1;
and
La' is —D—S'—BRB'—.

30. A wettable, flexible, oxygen permeable, substantially non-swellable ophthalmic device of claim 14 fabricated from a monomer having the formula L'—[(DAL)$_a$—(DS'LDAL)$_b$—]$_c$L"    (I)

wherein a is zero or 1;
each D, A, L, S', b and c is independently as defined in claim 14;
provided that when a=1, the terminal L group (exclusive of L' and L") of formula I may also be selected from —BR—;
L' is H, P'—BRB'—; or P'—RB'—;
L" is P', or, when a=0, also —DS'L$_a$'P';
L$_a$ being as defined in claim 14;
P' is H, NH$_2$, OH, or a moiety containing a crosslinkable group which may be crosslinked when co-reacted with a suitable crosslinking agent or when irradiated by actinic radiation.

31. The device of claim 1 wherein b=1.

32. The device of claim 30 wherein each D is oxygen.

33. The device of claim 30 wherein each L is —BRB'—, each B is —C(O)NH— wherein the nitrogen atom is bound to R, and R is

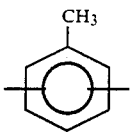

34. The device of claim 30 wherein R is

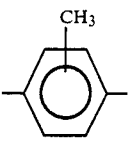

35. The device of claim 30 wherein each $R_1$ and $R_2$ is CH$_3$.

36. The device of claim 30 wherein n and m are each 4.

37. The device of claim 30 wherein y is from about 15 to about 50.

38. The device of claim 30 wherein n is 4; m is 4; and y is from about 15 to about 50.

39. The device of claim 30 wherein (w+x+z) times q is from about 25 to about 75.

40. The device of claim 30 wherein (a) each f, g, and h is 1 and $R_3$-$R_{20}$ are all hydrogen or (b) each f, g, and h is zero, each $R_3$, $R_4$, $R_8$-$R_{10}$, $R_{14}$-$R_{16}$, and $R_{20}$ is hydrogen, and each $R_7$, $R_{13}$, and $R_{19}$ is methyl.

41. The device of claim 30 wherein (w+x+z) times q is about 25 to about 75.

42. The device of claim 30 wherein c is 1.

43. The device of claim 30 wherein L' is P'—BRB'—.

44. The device of claim 30 wherein La' is —D—S'—BRB'—.

45. The device of claim 30 wherein each P' is

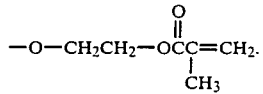

46. The device of claim 30 wherein
b is 1;
each D is oxygen;
each L is —BRB'—; +
each B and B' are —C(O)NH— with the nitrogen atom bound to R;
each R is CH$_3$

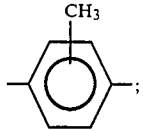

each $R_1$ and $R_2$ is methyl;
n and m are each 4;
y is from about 15 to about 50;
(w+x+z) times q is about 25 to about 75; and
(a) each f, g, and h is 1 and $R_3$-$R_{20}$ are all hydrogen; or
(b) each f, g, and h is zero; each $R_3$, $R_4$, $R_8$-$R_{10}$, $R_{14}$-$R_{16}$ and $R_{20}$ is hydrogen; and each $R_7$, $R_{13}$, and $R_{19}$ is methyl;
L' is P'BRB';

and P' is

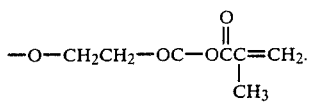

47. A method of correcting visual defects comprising applying to the eye of a patient in need thereof the device of claim 1.

48. The device of claim 1 wherein each A is of the formula

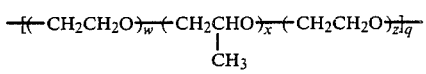

or

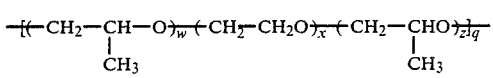

wherein each of w, x, z, and q are greater than zero.

49. The device of claim 48 wherein q is 1.

50. The device of claim 48 wherein w and z within any one A are the same.

51. The device of claim 48 wherein each w and each z has the same value.

52. An optically clear wettable, flexible, oxygen permeable, substantially non-swellable polymer of a crosslinkable monomer having a segment S'' of the formula

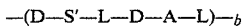

wherein
b is 1-10;
each D is independently —O— or —NR$_{21}$—;
each L is independently —BRB'—, the terminal L group within any one monomer also being capable of being —BR—;
each S' is independently of the formula

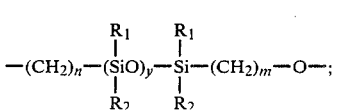

each A is independently of the formula

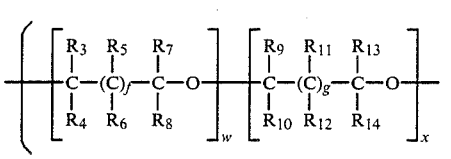

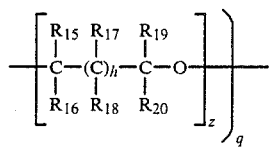

the terminal oxygen atom in formulae II or III being replaceable with —NR$_{21}$—;
each R$_1$ and R$_2$ is independently lower alkyl or aryl;
each R$_3$, R$_4$, R$_7$–R$_{10}$, R$_{13}$–R$_{16}$, R$_{19}$ and R$_{20}$ is independently selected from H, halogen, aliphatic, aromatic or heterocyclic containing radical selected from unsubstituted (C$_1$-C$_{16}$) alkyl; substituted C$_1$-C$_{16}$ alkyl; unsubstituted C$_2$-C$_{16}$ alkenyl; and substituted C$_2$-C$_{16}$ alkenyl; wherein the alkyl and alkenyl substituents are independently selected from C$_1$-C$_{16}$ alkoxycarbonyl, C$_2$-C$_{16}$ alkenyloxycarbonyl, fluoro, aryl of up to 10 carbon atoms, C$_1$-C$_{16}$ alkoxy, C$_2$-C$_{16}$ alkanoyloxy, aryloxy of up to 10 carbon atoms, C$_2$-C$_6$ alkenoyloxy, aroyl of up to 10 carbon atoms, aroyloxy of up to 11 carbon atoms, C$_3$-C$_8$ cycloalkyl, C$_3$-C$_8$ cycloalkyloxy, C$_3$-C$_8$ cycloalkyl-carbonyloxy, C$_3$-C$_8$ cycloalkoxy-carbonyl, oxacycloalkyl of up to 7 carbon atoms, oxacycloalkoxy of up to 7 carbon atoms, oxacycloalkoxy (up to 7 carbon atoms)-carbonyl, oxacycloalkyl (up to 7 carbon atoms)-carbonyloxy, and aryl (of up to 10 carbon atoms)-oxycarbonyl, each of said alkyl and alkenyl substituents being, in turn, optionally substituted by C$_1$-C$_6$ alkyl, fluoro or a C$_1$-C$_6$ alkoxy provided said last mentioned alkoxy is not bound to a carbon atom already singly bound to another oxygen atom; R$_3$, R$_4$, R$_7$–R$_{10}$, R$_{13}$–R$_{16}$, R$_{19}$ and R$_{20}$ being further independently selected from aryl of up to 10 carbon atoms, C$_3$-C$_8$ cycloalkyl, and oxacycloalkyl of up to 7 carbon atoms, each of which may be unsubstituted or further substituted with a substituent selected from the group of substituents for said R$_3$ alkyl set forth above; R$_5$, R$_6$, R$_{11}$, R$_{12}$, R$_{17}$ and R$_{18}$ are selected from the same group set forth above for R$_3$; and R$_5$, R$_6$, R$_{11}$, R$_{12}$, R$_{17}$ and R$_{18}$ are further independently selected from C$_1$-C$_{16}$ alkoxycarbonyl, C$_2$-C$_{16}$ alkanoyloxy, C$_2$-C$_{16}$ alkenoxycarbonyl, and C$_3$-C$_{16}$ alkenoyloxy, each of which is unsubstituted or further substituted by fluoro, aryl of up to 10 carbon atoms, or C$_1$-C$_{16}$ alkoxy; and R$_5$, R$_6$, R$_{11}$, R$_{12}$, R$_{17}$ and R$_{18}$ are still further independently selected from aryloxy of up to 10 carbon atoms, cycloalkoxy of up to 8 carbon atoms, cycloalkyl (of up to 8 carbon atoms)-carbonyloxy, cycloalkoxy (of up to 8 carbon atoms)-carbonyl, aroyloxy of up to 11 carbon atoms, oxacycloalkoxy of up to 7 carbon atoms, oxacycloalkenyloxy of up to 7 carbon atoms, oxacycloalkoxy (of up to 7 carbon atoms)-carbonyl, oxacycloalkyl (of up to 7 carbon atoms)-carbonyloxy, and aryloxy (of up to 10 carbon atoms)-carbonyl, each of which may be further substituted by fluoro, C$_1$-C$_6$ alkyl or C$_1$-C$_6$ alkoxy, provided that any substituent having a singly bound oxygen atom thereof as its link to the rest of the molecule may not be a substituent on the same carbon atom which is singly bonded to another oxygen atom; and 2 adjacent groups selected from R$_3$–R$_{20}$, together with the atoms to which they are attached may form a 5-8 membered cycloalkyl, oxacycloalkyl or bicycloalkyl ring;
each f, g and h are independently 0-3;
each w, x and z is independently 0-200;
q is 1-100;
(w+x+z) times q in any single group A is 4-1000;
each n and m is independently 1-6;
each y is independently 2-75;
each R$_{21}$ is independently H, C$_1$-C$_4$ alkyl, or phenyl;
each B and B' is independently

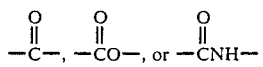

with the carbony in each case being bound to A, S′, or D; each R is independently
- (i) a divalent aliphatic group of up to 25 carbon atoms which may be interrupted by oxy, carbonyloxy, amino, aminocarbonyl, oxycarbonyl, ureido, oxycarbonylamino, or carbonylamino;
- (ii) a divalent 5-7 membered cycloaliphatic having 5-25 carbon atoms;
- (iii) a divalent arylene group have 6-25, preferably 7-15 carbon atoms; and
- (iv) a divalent aralkyl or alkaryl having 7 to 25; wherein groups b and d can be optionally interrupted by the same groups as in group i and wherein the aryl rings in groups iii and iv may be further substituted with one or more substituents selected from halogen, $C_1$-$C_4$ alkyl, and $C_1$-$C_{12}$ perhalo alkyl;

said device having a receding contact angle of less than 60%; being less than about 10% water in its swollen state; and having a Dk ($\times 10^{-10}$ mm cc$O_2$/cm.$^2$sec.mmHg) of at least about 7.

53. A wettable, flexible, oxygen permeable, substantially non-swellable polymer of claim 52
    (a) fabricated from a crosslinkable monomer having a partial formula

wherein each S″ is independently a segment of formula I′ of claim 52;
each D, A and L is independently as defined in claim 52;
c is 1-8;
and b times c is 1-8;
or (b) fabricated from a crosslinkable monomer having a partial formula

$L'_a$ being selected from —DS′BRB′— and —DS′BR—; B, R and B′ are as defined in claim 1, and wherein S″, c, D and L are as defined above and S′ B, R, B′ are as defined in claim 52.

54. A wettable, flexible, oxygen permeable, substantially non-swellable polymer of claim 53 fabricated from a monomer having the formula

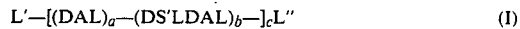

wherein a is zero or 1;
each D, A, L, S′, b and c is independently as defined in claim 53;
provided that when a=1, the terminal L group (exclusive of L′ and L″) of formula I may also be selected from —BR—;
L′, is H, P′—BRB′—; or P′—RB′—;
L″ is P′, or, when a=0, also —DS′$L_a$′P′;
$L_a$ being as defined in claim 53;
P′ is H, $NH_2$, OH, or a moiety containing a crosslinkable group which may be crosslinked when co-reacted with a suitable crosslinking agent or when irradiated by actinic radiation.

* * * * *